Jan. 15, 1957 R. BURZI 2,777,731
MOTOR ROAD VEHICLES
Filed Aug. 3, 1955 3 Sheets-Sheet 1
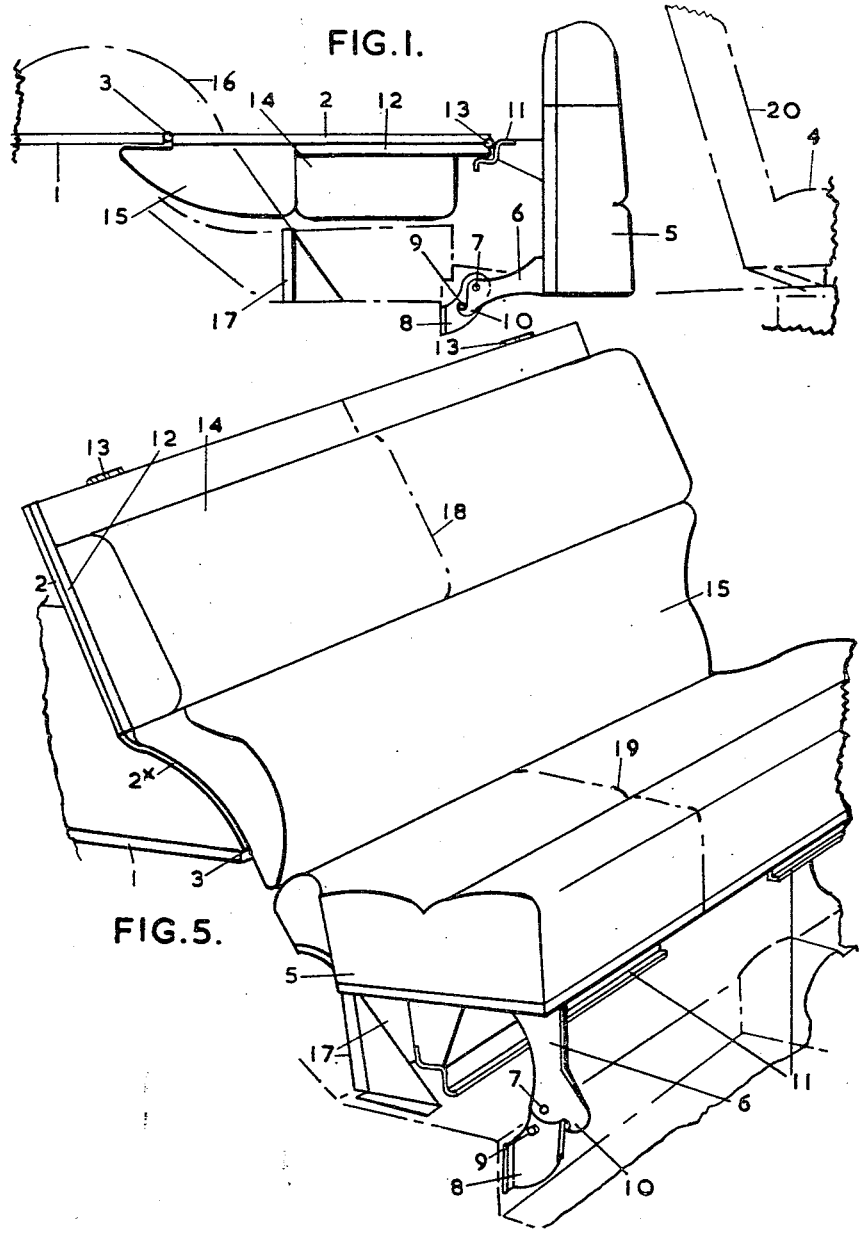

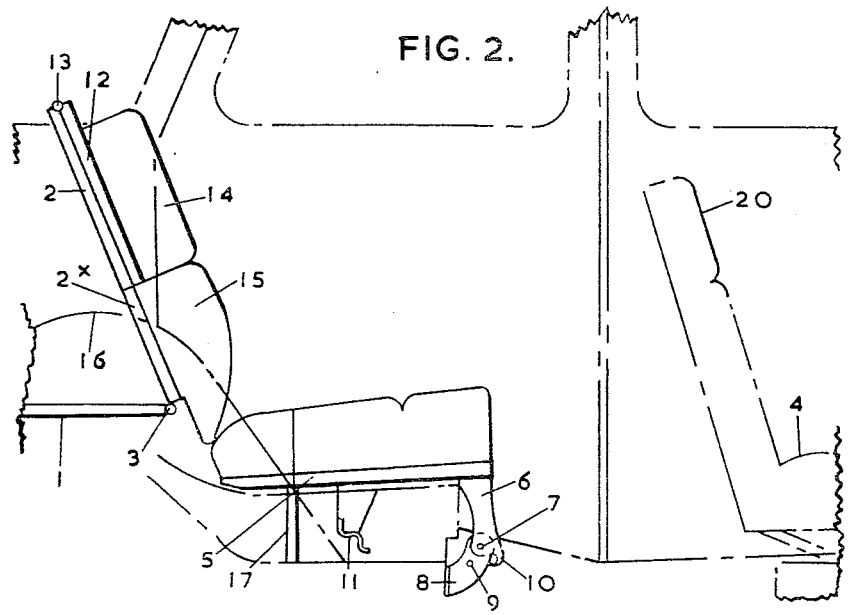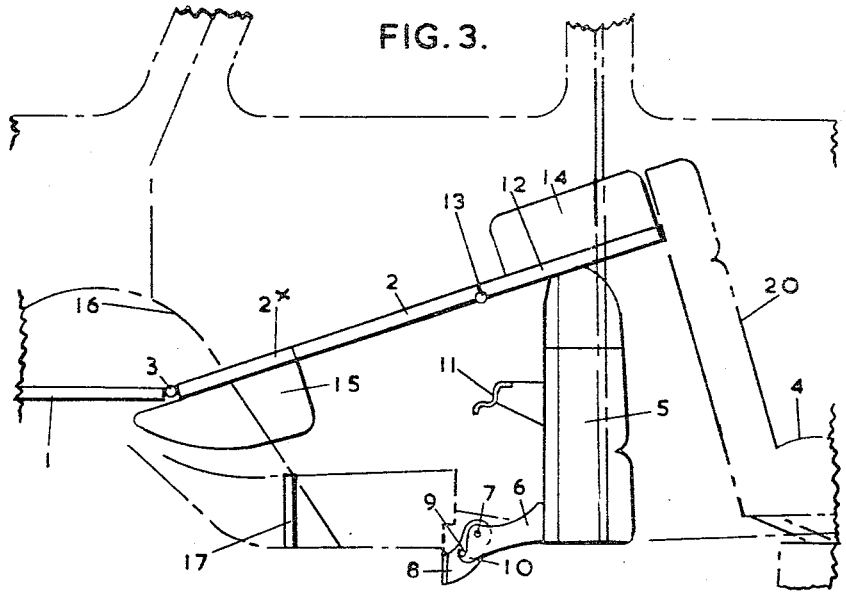

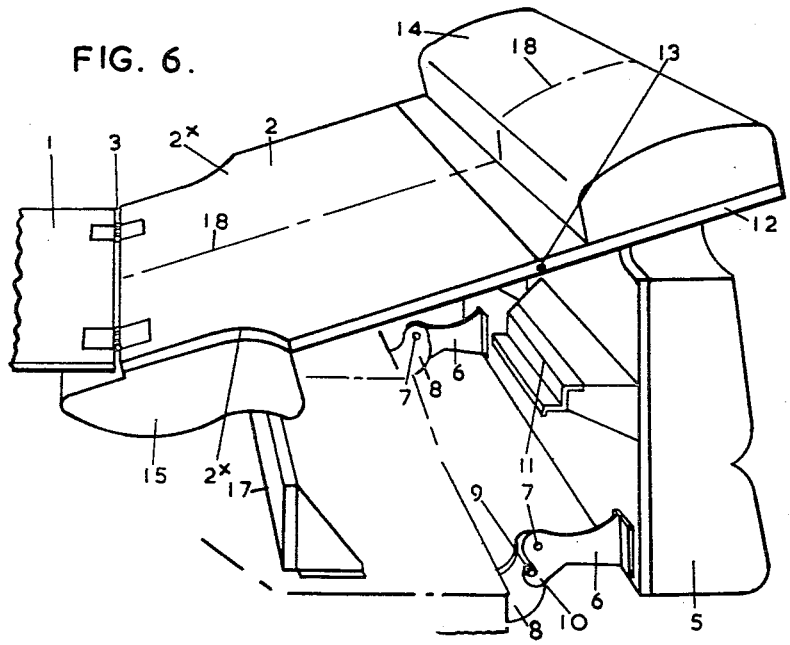
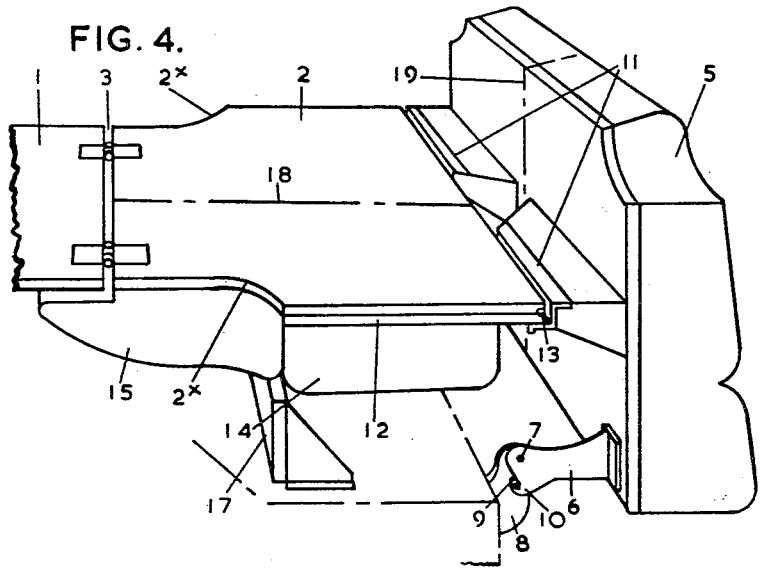

United States Patent Office 2,777,731
Patented Jan. 15, 1957

2,777,731
MOTOR ROAD VEHICLES

Richard Burzi, Northfield, Birmingham, England, assignor to The Austin Motor Company Limited, Birmingham, England Application August 3, 1955, Serial No. 526,165

Claims priority, application Great Britain August 18, 1954

4 Claims. (Cl. 296—66)

This invention relates to motor road vehicles of the kind variously referred to as station or estate cars, shooting brakes or commercial vans.

Vehicles of this kind have a non-compartmented body with side doors, affording access to the driver's seat and a passenger seat alongside it, and with full opening rear doors giving access to a load supporting platform which extends from the rear to the seating accommodation at the forward end and is generally at the level of the top of the rear wheel arches which project inwardly from the side walls of the body.

In vehicles of the kind referred to it is customary to provide for the accommodation of two or three additional passengers upon a full width bench type seat which is collapsible. This provision has usually been made by constructing the platform in two parts pivotally connected together about a transverse axis, the rear part being fixed and the forward part being free to be turned up into a position in which it constitutes the backrest for the additional passenger seat proper. In this connection the underside of this forward part of the platform usually has a back cushion or squab permanently attached thereto and the additional seat proper has a transverse pivotal attachment with the floor of the vehicle body, the arrangement being such that said seat proper when erected occupies a substantially horizontal position immediately in front of the lower part of the turned-up backrest portion of the platform but can be swung forwardly about its pivotal connection with the floor into a collapsed or out-of-way position in which it is disposed vertically on edge to the rear of the driver's seat and the passenger seat alongside the latter, whereupon the said backrest portion can be turned down forwardly into horizontal position with its then foremost edge immediately to the rear of the vertically disposed seat proper which extends some distance above the level of the platform.

The object of the present invention is to make provision, in a vehicle of the kind referred to, and without increasing the length or width of the body, of a bed for accommodating one or more persons lying down in a fully stretched out state so that they can rest comfortably.

According to the present invention, the forward part of the platform in the vehicle body is provided with an extension piece which, when said forward part has been turned up sufficiently, can be moved into a position substantially in alignment therewith and which, when said forward part and its extension piece so aligned are lowered, will engage upon and be supported by the upper edge of the collapsed or vertically disposed additional seat proper and preferably projects forwardly beyond it.

The invention will now be described with reference to the embodiment illustrated in the accompanying drawings; in which:

Figs. 1, 2 and 3 are fragmentary side elevations of the load platform and seating arrangement in a motor vehicle of the station or estate car type, whilst Figs. 4, 5 and 6 are fragmentary perspective views of the platform and the rear or occasional seat in various positions respectively similar to those shown in Figs. 1, 2 and 3. Portions of the vehicle body and the front seating are shown in chain lines in the drawings.

Referring to the drawings, and more particularly to Figs. 1 and 4 which show the parts in the positions they usually occupy, the load platform comprises the usual fixed rear part 1 and the forward part 2, which is hinged thereto about a transverse axis at 3, the front seating 4 and the usual collapsible rear seat 5. The occasional seat 5 has front legs 6 pivotally mounted at 7 to fixed brackets 8 on the floor of the body, which brackets 8 have stop pins 9 with which hook-like abutments 10 on said legs 6 are adapted to co-operate, whilst flanged brackets 11 are fixed to the underside of said seat 4.

Normally the occasional seat 5 occupies a collapsed or out-of-way position in which it is disposed and supported vertically on edge, and immediately to the rear of the front seating 4, with the abutments 10 engaging the stop pins 9 on the brackets 8, and the forward part 2 of the load platform is usually horizontally disposed in line with the main part 1 and supported in that position by the flanges of the brackets 11 on the underside of the seat 5 (see Figs. 1 and 4).

An extension piece 12 which normally occupies a position beneath and flat against the substantially horizontal forward part 2 of the platform is hinged to its forward edge at 13, and a cushion 14 is affixed to what is normally the underside of this extension piece 12, whilst a further cushion 15 is affixed to the platform forward part 2 on that portion of its underside which is not normally covered by the extension piece 12 (see Figs. 1 and 4), said cushions 14, 15 being disposed closely alongside each other and extending across the full widths of the extension piece 14 and platform forward part 2 respectively.

When the parts are in their normal positions as shown in Figs. 1 and 4, a full length platform, extending from the rear wall of the vehicle body to the back of the front seats 4, is afforded by the horizontally aligned platform parts 1, 2 for supporting luggage or other articles. On occasions when it is desired to accommodate passengers on the rear seat 5 this can be done, at the expense of platform space, by turning the platform part 2, with its extension piece 12, up into a somewhat rearwardly inclined position against stops and erecting the rear seat 5 as shown in Figs. 2 and 5. In these positions, shouldered portions 24 of the platform part 2 engage upper parts of the rear wheel arches 16 which constitute stops to determine the rearwardly inclined position of the said part 2, so that the latter, with its extension piece 12 and associated cushions 14, 15 serves as an upholstered backrest for passengers on the rear seat 5, whilst the latter, in its erected or in-use position, is supported substantially horizontally by a fixed bracket 17 on the floor of the body.

If it is desired to extend the platform for use as a bed, the rear seat 5 is left in its normal collapsed condition, the forward part 2 of the platform and its extension piece 12 are raised bodily about the hinges 3 to a position well clear of the collapsed seat 5, and the said extension piece 12 is swung about the pivotal connection 13 through 180° to bring it into an aligned forwardly projecting position with its cushion 14 presented upwardly, whereupon the forward platform part 2 and aligned extension piece 12 are lowered together about the pivotal connection at 3 until they become supported by the said extension piece 12 engaging down upon the upper edge of the collapsed seat 5, as shown in Figs. 3 and 6. In this position, the platform part 2 and aligned extension piece 12 are supported at a small angle to the horizontal fixed part 1 of the platform and constitute therewith a full length bed for two persons, the cushion 14 serving as a pillow or head rest.

Instead of the forward part of the platform, the extension piece 12 and the cushion 14 each being of one-piece construction, they may each be divided in the vertical centre plane of the body as indicated by the chain line 18 in Figs. 4, 5 and 6, so that either half of the platform part 2 with its associated half extension piece 12 and half cushion 14 can be used as a full length bed for one person, leaving the other half platform part 2 and its half extension piece 12 in their normal positions corresponding to that shown in Figs 1 and 4. Also the seat 5, instead of being a full bench seat, may be similarly divided into two single seats, as indicated by chain line 19 in Figs. 4 and 5, so that when the platform is extended as a full length bed for one person only at either side of the body, as above described, the forward platform half part 2 on the other side can be turned up, with its associated half extension piece 12 and half cushion 14, into its backrest position and the corresponding half of the seat 5 (which would, of course, be provided with two front legs 6) can be erected for use. Thus in addition to the front seat accommodation, the vehicle can be adapted for two further passengers both sitting up on the rear seat, or both lying down side by side on a full width bed, or one sitting down on either half of the rear seat and the other lying down on a single bed on the opposite side of the body.

Where an exceptionally long bed is required, the extension piece 12 may be of greater length and the backrest 20 of the front seating 4 may be hinged to tilt forwardly to a position where it will not be fouled by said extension piece 12 when the latter is engaged down upon the upper edge of the collapsed rear seat 5. In such case where the platform part 2 and longer extension piece 12 are both divided into halves, the front seating 4 would also preferably be divided centrally to comprise separate seats for the driver and a passenger immediately alongside him, so that the platform can be extended on one side as a bed without disturbing the driver's seat and the rear seat immediately behind the driver is left available for use if required.

It will be appreciated that a vehicle with provision for a full length bed according to the invention will have considerable advantages especially when used for touring or camping holidays in that it affords sleeping accommodation, completely under cover and protected from the weather, and also that such a vehicle is suitable for use as a temporary ambulance for one or more lying-down cases say in an emergency.

Having fully described my invention, what I claim and desire to secure by Letters Patent is:

1. In a motor road vehicle of the kind referred to comprising, behind the front seating, an additional passenger seat which normally occupies a forwardly-collapsed out-of-way position, in which it is disposed vertically on edge to the rear of said front seating, and a load-supporting platform constituted by a horizontal rear fixed part and a forward part having pivotal connection therewith about a transverse axis, which platform forward part normally occupies a substantially horizontal position but can be turned up into a position in which it constitutes a backrest for said additional passenger seat when the latter is erected for use, the combination with said platform forward part of an extension piece movably associated with said platform forward part and normally occupying a position below said platform when in a horizontal position, and being adapted, when said platform forward part is raised sufficiently, to be moved forwardly for connection in an aligned position with said platform forward part, said alignedly connected extension piece and platform parts being supported by the forwardly-collapsed additional seat when the former is lowered into engagement with the upper edge of the latter, whereupon the platform rear fixed part, and the platform forward part with its alignedly connected extension piece then jointly afford a full length bed.

2. In a motor road vehicle of the kind referred to comprising, behind the front seating, an additional passenger seat which normally occupies a forwardly-collapsed out-of-way position, in which it is disposed vertically on edge to the rear of said front seating, and a load-supporting platform constituted by a horizontal rear fixed part and a forward part having pivotal connections therewith about a transverse axis, which platform forward part normally occupies a substantially horizontal position but can be turned up into a position in which it constitutes a backrest for said additional passenger seat when the latter is erected for use, the combination with said platform forward part of an extension piece which normally occupies a position beneath the substantially horizontal forward part of the platform and has pivotal connection with the forward edge thereof so that, when said platform forward part has been raised well clear of the forwardly collapsed additional seat, said extension piece can be swung about its pivotal connection into an aligned and forwardly projecting position and said platform forward part with its aligned extension piece can then be lowered together about the pivotal connection with the rear fixed platform part until they become supported by the extension piece engaging down upon the upper edge of the forwardly-collapsed additional seat, the platform rear fixed part and the platform forward part with its aligned extension piece then jointly affording a full length bed.

3. A motor road vehicle of the kind referred to and comprising in combination, front seating, an additional passenger seat which normally occupies a forwardly-collapsed out-of-way position, in which it is disposed vertically on edge to the rear of said front seating, a load-supporting platform constituted by a full width horizontal rear fixed part and a full width forward part, the latter being divided in the vertical centre plane of the body into two half portions each of which has pivotal connection with the rear fixed platform part about a common transverse axis and each of which half portions of the platform forward part normally occupies a substantially horizontal position but can be turned up into a position in which it constitutes a backrest for said additional passenger seat when the latter is erected for use, two platform extension pieces which normally occupy positions beneath the substantially horizontal platform forward part constituted by said half portions and have pivotal connections respectively with the forward edges of such half portions so that, when a half portion of the platform forward part on either side of the vertical centre plane has been raised well clear of the additional seat, its associated extension piece can be swung about its pivotal connection into an aligned and forwardly projecting position and said raised half portion of the platform forward part with its aligned extension piece can then be lowered together about the pivotal connection with the rear fixed platform part until they become supported by said extension piece engaging down upon the upper edge of the collapsed additional seat, the platform rear fixed part and one of the half portions of the platform forward part with its aligned extension piece then jointly affording a full length bed on the corresponding side of the vertical centre plane of the vehicle body.

4. A motor road vehicle as claimed in claim 3, in which the additional passenger seat is divided in the vertical centre plane of the vehicle body so that, when the platform is extended as a full length bed at only one side of said plane, the half portion of the platform forward part on the other side can be turned up into its backrest position and the associated part of said additional passenger seat can be erected for use if required.

References Cited in the file of this patent

UNITED STATES PATENTS

| 1,894,103 | Kuenzel | Jan. 10, 1933 |
| 2,602,691 | Doty | July 8, 1952 |

FOREIGN PATENTS

| 1,024,572 | France | Jan. 10, 1953 |
| 881,005 | Germany | June 25, 1953 |
| 419,329 | Great Britain | Nov. 9, 1934 |